(12) United States Patent
Smith et al.

(10) Patent No.: US 7,913,585 B2
(45) Date of Patent: Mar. 29, 2011

(54) ANNULAR RING AND ANNULAR RING ASSEMBLY FOR CONTROLLABLE POSITIONING ON A PILOT TUBE

(75) Inventors: David Smith, Wadsworth, OH (US); Brian Zaugg, Millersburg, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 917 days.

(21) Appl. No.: 11/805,597

(22) Filed: May 24, 2007

(65) Prior Publication Data

US 2008/0008524 A1 Jan. 10, 2008

Related U.S. Application Data

(60) Provisional application No. 60/809,433, filed on May 30, 2006.

(51) Int. Cl.
*F16D 13/75* (2006.01)
(52) U.S. Cl. .................. 74/531; 192/111.13; 192/111.14
(58) Field of Classification Search ............ 74/531; 192/70.252, 111.13, 111.14; 248/125.8, 248/410; 470/163; 403/225, 372, 109.2, 403/109.8, 365; 188/67; 411/517, 519
See application file for complete search history.

(56) References Cited

U.S. PATENT DOCUMENTS

| | | | | |
|---|---|---|---|---|
| 2,798,748 A * | 7/1957 | Albrecht | ................. | 403/372 |
| 2,988,058 A * | 6/1961 | Hans | .................. | 92/28 |
| 3,221,854 A * | 12/1965 | Jaeschke et al. | ........... | 192/84.51 |
| 3,376,964 A * | 4/1968 | Root | ................. | 192/111.14 |
| 3,478,853 A * | 11/1969 | Kraeplin | ........... | 192/111.14 |
| 3,868,006 A * | 2/1975 | Linn et al. | ........... | 192/111.14 |
| 3,871,500 A * | 3/1975 | Linn et al. | ........... | 192/111.14 |
| 4,564,088 A * | 1/1986 | Takahashi et al. | ........... | 188/67 |
| 5,603,532 A | 2/1997 | Guest | | |

* cited by examiner

*Primary Examiner* — Richard W Ridley
*Assistant Examiner* — Thomas Diaz
(74) *Attorney, Agent, or Firm* — Simpson & Simpson, PLLC

(57) ABSTRACT

The present invention broadly comprises an assembly for incrementally changing an axially fixable position, including an annular gripping element with at least one deformation segment, a glide push ring axially displaceable along a pilot element, and a wedge push ring axially displaceable along the pilot element. The gripping element is in contact with a circumference of the pilot element and the deformable segments are circumferentially deformable in response to a change in a gripping element diameter. The glide ring incrementally urges the gripping element in a first direction along the pilot element. The gripping element axially fixes responsive to force applied by the wedge ring in a second direction, opposite the first direction, along the pilot element. A surface between gripping element inner and outer circumferences forms a fixed angle with the pilot element despite changes in the inner or outer circumferences.

21 Claims, 14 Drawing Sheets

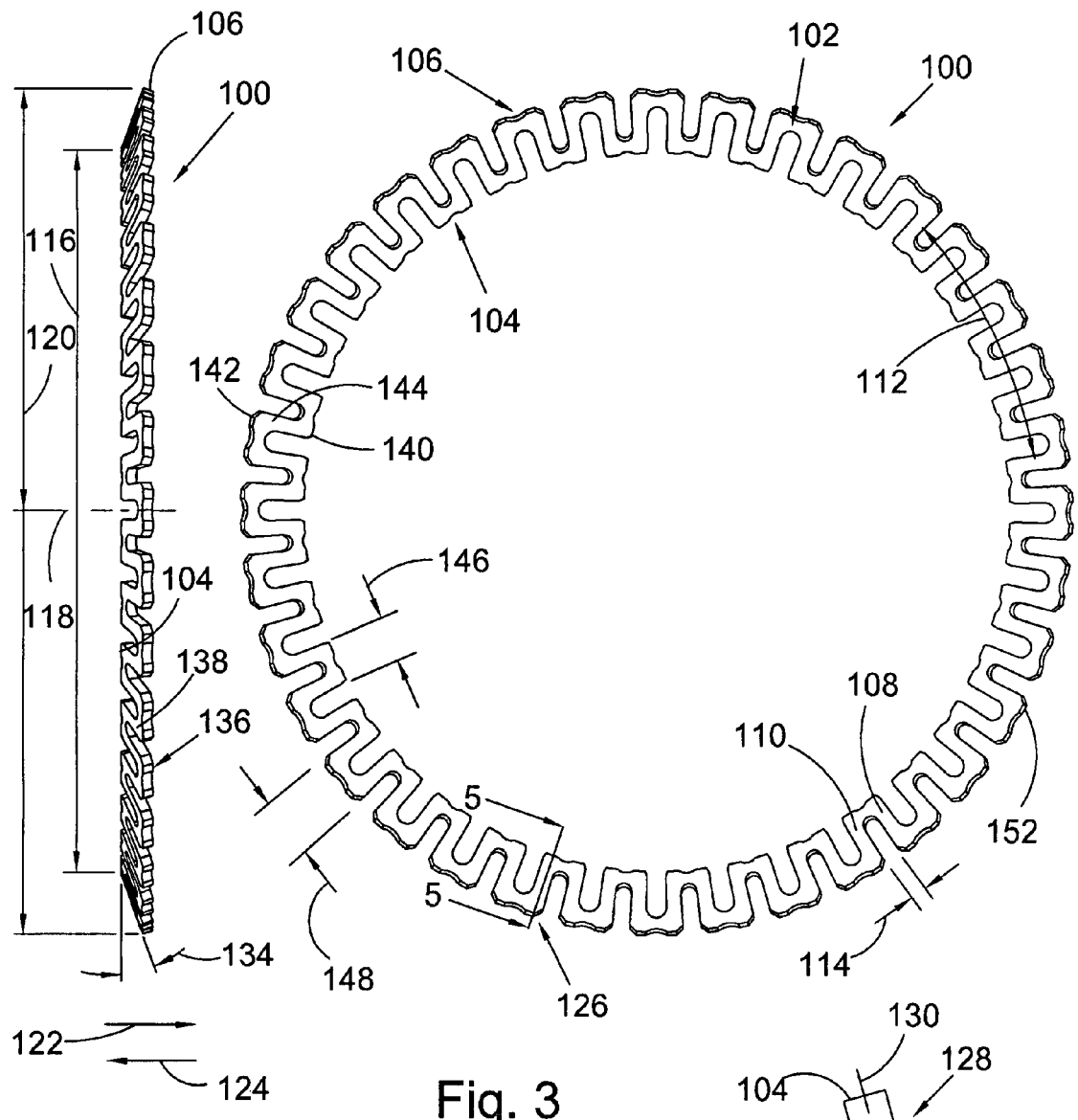
Fig. 4
Fig. 3
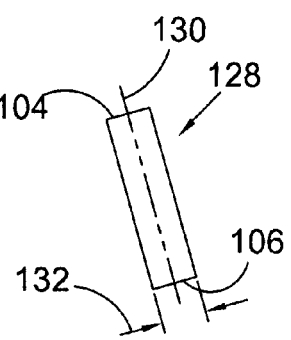
Fig. 5

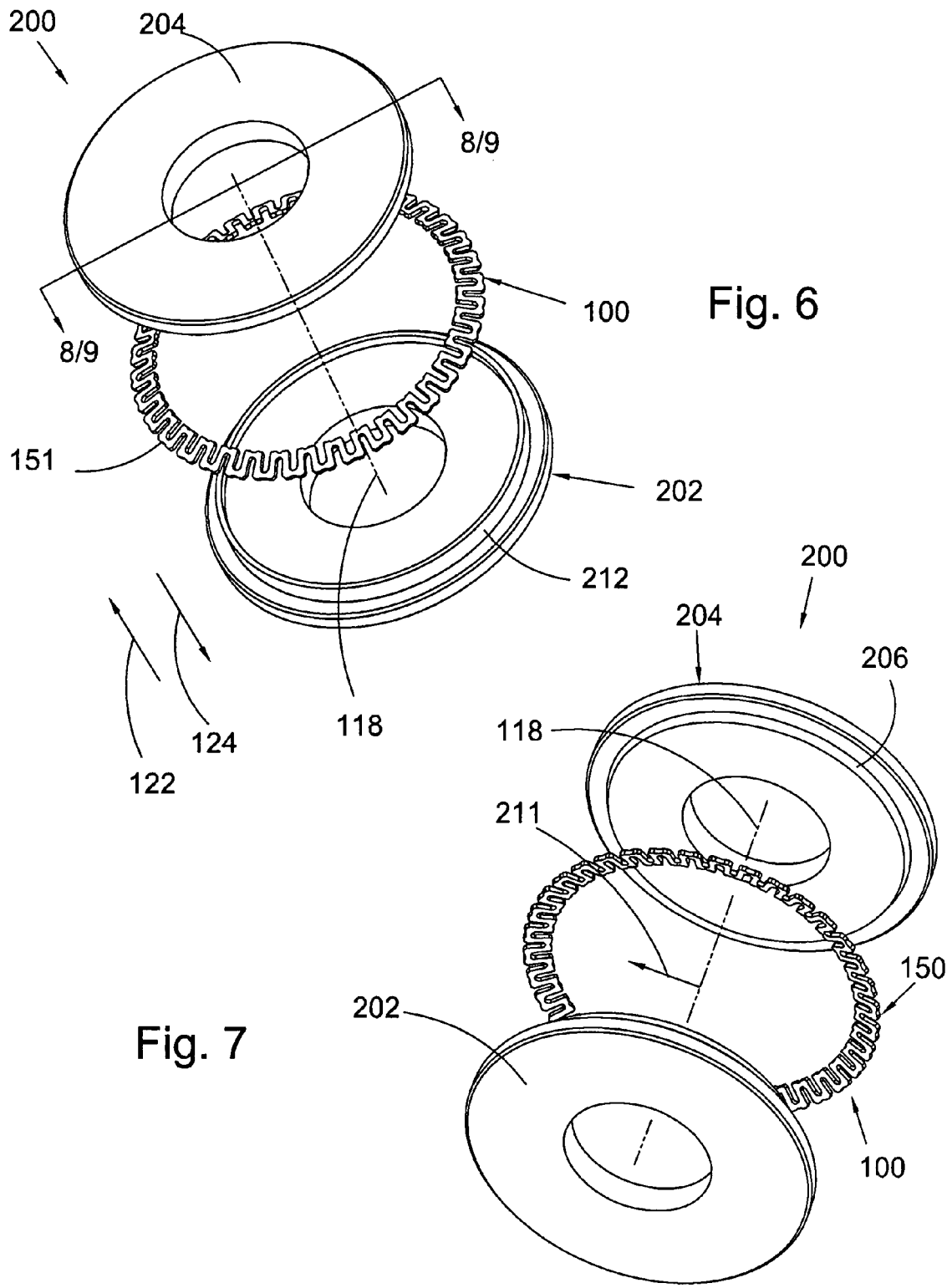

ANNULAR RING AND ANNULAR RING ASSEMBLY FOR CONTROLLABLE POSITIONING ON A PILOT TUBE

CROSS-REFERENCE TO RELATED APPLICATIONS

This application claims the benefit under 35 U.S.C. §19(e) of U.S. Provisional Application No. 60/809,433 filed May 30, 2006

FIELD OF THE INVENTION

The invention relates to an assembly for incrementally changing an axially fixable position. Specifically, the invention relates to an axial one-way clutch and an annular gripping element for use with a pilot element.

BACKGROUND OF THE INVENTION

Modern automotive clutch designs typically include systems which compensate for disc facing wear. This is done to maintain proper clamp load on the discs and a consistent engagement and disengagement force at the clutch pedal. It is known to use systems that make adjustment in predetermined steps. Unfortunately, these steps can be relatively far apart and can result in a variation of travel or stroke length between steps. With the introduction of dual-clutch systems, wear compensation systems must grow more compact. Another trend in automotive design is the industrialization of component parts, which results in broader tolerances for components.

It is known to use shims or other adjustment elements to establish a specified travel or stroke length for a stacked assembly such as a clutch. Unfortunately, the use of such means can be complex, costly, and time consuming.

Thus, there is a long-felt need for a means of compensating for disc facing wear that is incrementally adjustable, axially compact, absorbs significant amounts of tolerance stack-up, and performs well under corrosion and contamination. There also is a long-felt need for a means of adjusting for tolerance variations in a stacked assembly without adding additional components or assembly steps.

BRIEF SUMMARY OF THE INVENTION

The present invention broadly comprises an assembly for incrementally changing an axially fixable position, including an annular gripping element with at least one deformation segment, a glide push ring axially displaceable along the pilot element and engageable with the gripping element, and a wedge push ring axially displaceable along the pilot element and engageable with the gripping element. The gripping element is in contact with a circumference of a pilot element and the deformable segment is circumferentially deformable in response to a change in a diameter of the gripping element. The glide push ring is arranged to incrementally urge the gripping element in a first direction along the pilot element. The gripping element is arranged to axially fix in response to force applied by the wedge push ring in a second direction, opposite the first direction, along the pilot element.

In some aspects, the annular gripping element includes a circumference and the wedge ring includes a surface arranged to contact the circumference. In some aspects, the circumference and the surface are complimentarily shaped or are substantially parallel. The contact of the circumference and the surface increases the resistance to motion in the second direction. In some aspects, the surface tapers radially inward or outward in the second direction. In some aspects, the wedge ring is arranged to transmit a force to the gripping element in the second direction, the gripping element includes inner and outer circumferences, and the gripping element comprises a straight loading path for the force between the inner and outer circumferences.

In some aspects, the pilot element includes an axial radial plane, the gripping element includes inner and outer circumferences with respective surfaces, and a cross section taken along the axial plane. The cross section includes a center line between the respective surfaces, and the cross section is substantially symmetrical about the center line. In some aspects, the wedge ring is arranged to transmit a force to the gripping element in the second direction and the cross section is symmetrical about the center line under the force. In some aspects, the pilot element circumference includes a circumferential surface, the gripping element includes a surface arranged to engage the circumferential surface.

In some aspects, the gripping element includes inner and outer circumferences, one of the inner and outer circumferences is arranged to contact the pilot element circumference, and the wedge ring surface is arranged to contact the gripping element proximate the other of the inner and outer circumferences. In some aspects, the gripping element includes inner and outer circumferences, one of the inner and outer circumferences is arranged to contact the pilot element circumference, and the glide push ring is arranged to contact the gripping element proximate the other of the inner and outer circumferences.

In some aspects, the gripping element includes inner and outer circumferences and a first circumference, in some cases approximately mid-way, between the inner and outer circumferences. The gripping element is arranged such that a modification of one of the inner or outer circumferences causes a substantially proportional modification of the first circumference. In some aspects, the wedge ring is arranged to transmit a force to the gripping element in the second direction, the gripping element includes inner and outer circumferences and a second circumference, in some cases approximately mid-way, between the inner and outer circumferences, and the gripping element is free of twisting about the second circumference before and after the application of the force.

In some aspects, the glide and push rings are axially fixed with respect to each other, the pilot element circumference is an inner circumference of the pilot element, the pilot element circumference is an outer circumference of the pilot element, or the glide and wedge rings are rotatable with respect the pilot element. In some aspects, the gripping element is arranged to be displaceable in the first direction in response to a minimum force with a first magnitude, the gripping element is arranged to be non-displaceable in the second direction in response to a maximum force with a second magnitude, and the second magnitude is at least four times greater than the first magnitude.

In some aspects, the gripping element includes inner and outer circumferences and is arranged to form an angle with respect to the pilot element. The gripping element is arranged to maintain the angle in response to changes in the inner and outer circumferences. In some aspects, the changes in the inner and outer circumferences are radial.

The present invention also broadly comprises an annular gripping element, including at least one deformation segment and inner and outer circumferences. One of the circumferences is arranged to engage a circumferential surface of a pilot element, the deformation segment is circumferentially deformable in response to a modification of the circumferences, and the gripping element is arranged to incrementally move along the pilot element in a first direction and to axially fix in response to force applied in a second direction, opposite the first direction. In some aspects, the circumferential surface includes an outside diameter greater than the gripping element inner diameter and the deformation segment is arranged to circumferentially expand. In some aspects, the circumferential surface includes an inside diameter less than the gripping element outer diameter and the deformation segment is arranged to circumferentially compress.

In some aspects, the gripping element includes an axial plane and a cross section taken along the axial plane and substantially symmetrical about the plane. In some aspects, the gripping element includes a longitudinal axis and the inner and outer circumferences are longitudinally misaligned. In some aspects, the gripping element inner circumference includes a plurality of first segments, the gripping element outer circumference comprises a plurality of second segments, and respective first and second segments are joined by respective radially disposed segments. In some aspects, each of the first segments is substantially equal in circumferential length and each of the second segments is substantially equal in circumferential length.

It is a general object of the present invention to provide a means for providing incremental movement of an annular gripping element in one axial direction of a pilot element and substantial resistance of the gripping element to force from an opposite axial direction.

It is another object of the present invention to provide an axial one-way clutch that can be incrementally displaced in the glide direction by a minimal force while remaining axially fixed in the face of greater force from an opposite axial direction.

It is yet another object of the present invention to provide an axial one-way clutch that is adaptable to a pilot element having broad diametric tolerances.

It is a further object of the present invention to provide an axial one-way clutch usable as a travel limiter for a clutch assembly.

It is a still further object of the present invention to provide an axial one-way clutch to compensate for disc face wear in a clutch assembly.

It is a yet further object of the present invention to provide an axial one-way clutch usable on the inner or outer diameter of a pilot tube.

It is still another object of the present invention to provide an axial one-way clutch able to compensate for tolerances variations in an assembly housing the clutch without the use of additional components such as shims.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 3 is a front view of the gripping element shown in FIG. 2;

FIG. 4 is a side view of the gripping element shown in FIG. 2;

FIG. 5 is a cross-sectional view along line 5-5 in FIG. 3;

FIG. 6 is a back exploded view of a present invention axial one-way clutch assembly arranged to engage an inner circumference of a pilot element;

FIG. 7 is a front exploded view of the axial one-way clutch assembly shown in FIG. 6;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
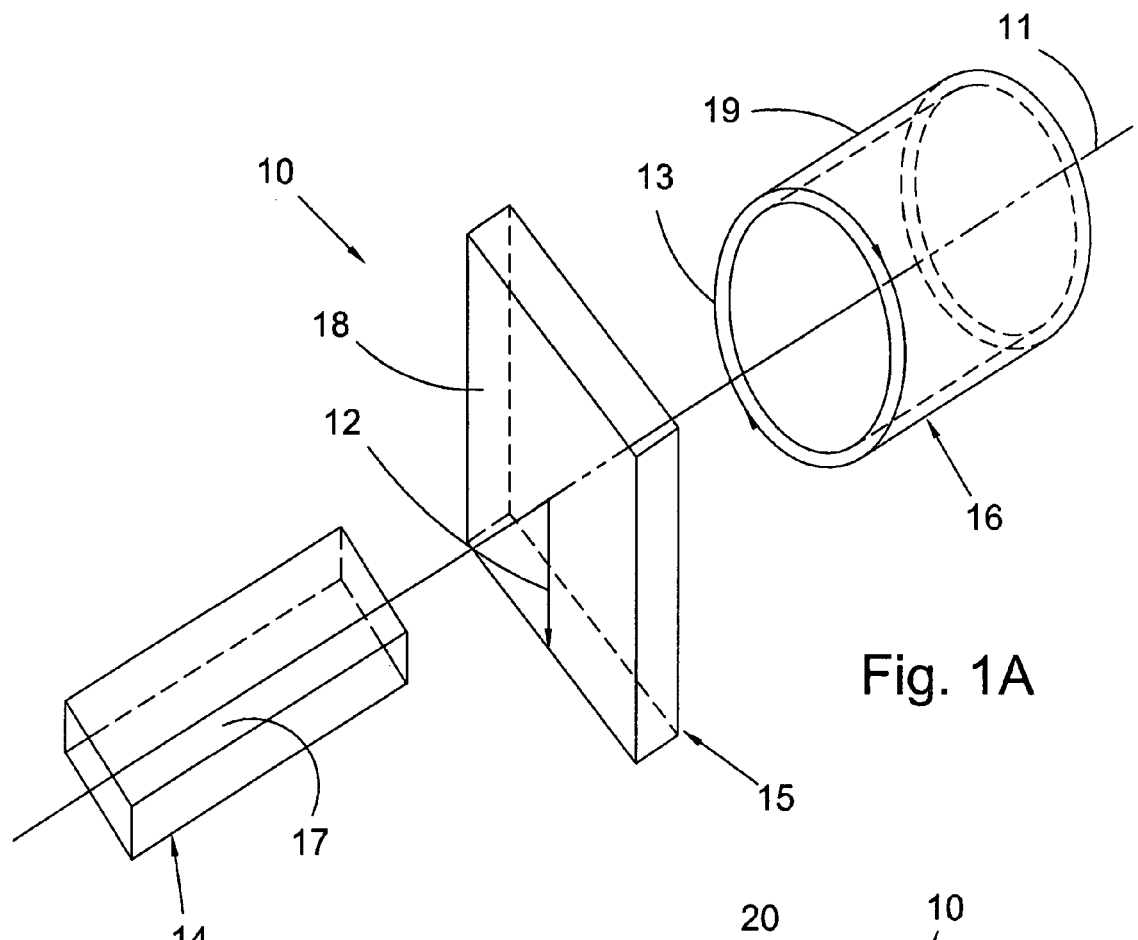
FIG. 1A is a perspective view of a cylindrical coordinate system demonstrating spatial terminology used in the present application.

FIG. 1A is a perspective view of cylindrical coordinate system 10 demonstrating spatial terminology used in the present application. The present invention is at least partially described within the context of a cylindrical coordinate system. System 10 has a longitudinal axis 11, used as the reference for the directional and spatial terms that follow. The adjectives "axial," "radial," and "circumferential" are with respect to an orientation parallel to axis 11, radius 12 (which is orthogonal to axis 11), or circumference 13, respectively. The adjectives "axial," "radial" and "circumferential" also are regarding orientation parallel to respective planes. To clarify the disposition of the various planes, objects 14, 15, and 16 are used. Surface 17 of object 14 forms an axial plane. That is, axis 11 forms a line along the surface. Surface 18 of object 15 forms a radial plane. That is, radius 12 forms a line along the surface. Surface 19 of object 16 forms a circumferential plane. That is, circumference 13 forms a line along the surface. As a further example, axial movement or disposition is parallel to axis 11, radial movement or disposition is parallel to radius 12, and circumferential movement or disposition is parallel to circumference 13. Rotation is with respect to axis 11.

The adverbs "axially," "radially," and "circumferentially" are with respect to an orientation parallel to axis 11, radius 12, or circumference 13, respectively. The adverbs "axially," "radially," and "circumferentially" also are regarding orientation parallel to respective planes.

Figure 1B:
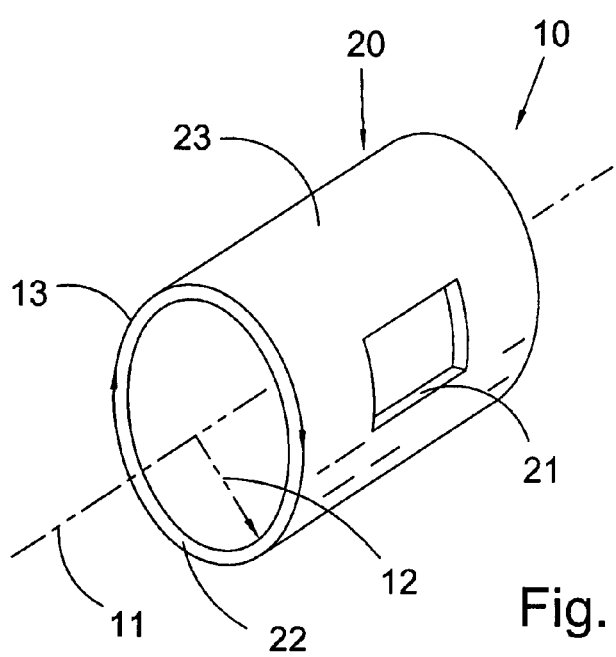
FIG. 1B is a perspective view of an object in the cylindrical coordinate system of FIG. 1A demonstrating spatial terminology used in the present application.

FIG. 1B is a perspective view of object 20 in cylindrical coordinate system 10 of FIG. 1A demonstrating spatial terminology used in the present application. Cylindrical object 20 is representative of a cylindrical object in a cylindrical coordinate system and is not intended to limit the present invention is any manner. Object 20 includes axial surface 21, radial surface 22, and circumferential surface 23. Surface 21 is part of an axial plane, surface 22 is part of a radial plane, and surface 23 is part of a circumferential plane.

Figure 2:
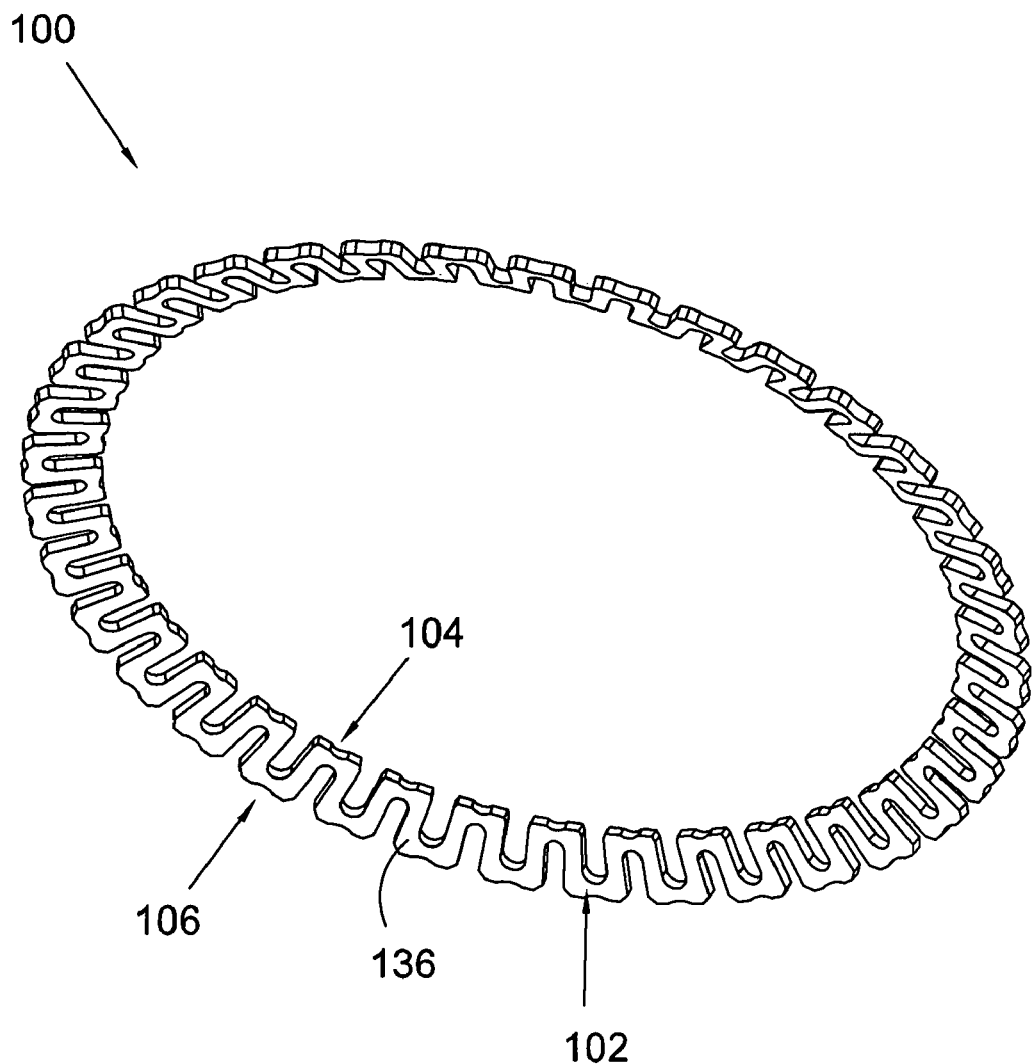
FIG. 2 is a perspective view of a present invention gripping element for an assembly for incrementally changing an axially fixable position.

FIG. 2 is a perspective view of present invention annular gripping element 100 for an assembly for incrementally changing an axially fixable position.

FIG. 3 is a front view of annular gripping element 100 shown in FIG. 2.

FIG. 4 is a side view of annular gripping element 100 shown in FIG. 2. The following should be viewed in light of FIGS. 2 through 4. Annular gripping element 100 includes at least one deformation segment 102 and inner circumferential edge 104 and outer circumferential edge 106. Edges 104 and 106 also can be referred to as inner and outer circumferences 104 and 106, respectively. As described infra, one of the circumferential edges is arranged to engage a circumferential surface of a pilot element (not shown). In response to that engagement, deformation segments 102 are circumferentially deformable. By circumferentially deformable, we mean that neighboring radial segments, for example, elements 108 and 110 move closer together or further apart with respect to circumferential line 112, which, in some aspects, is approximately midway between edges 104 and 106. Line 112 extends all around element 100, however, for the sake of clarity is only shown in part.

For example, segments 108 and 110 move apart, increasing space 114 if inner diameter 116 is sufficiently (radially) expanded with respect to longitudinal axis 118. Segments 108 and 110 move closer together, decreasing space 114, if outer diameter 120 is decreased. As further described infra, gripping element 100 is arranged to incrementally move along the pilot element in direction 122 and to axially fix in response to force applied to element 100 in direction 124, opposite direction 122. By axially fix, we mean that element 100 does not move axially in direction 124. For example, element 100 remains substantially axially fixed in direction 124 up to a certain maximum loading point for force applied in direction 124.

In some aspects, the circumferential surface of the pilot element has an outside diameter greater than inner diameter 116 and deformation segments 102 are arranged to circumferentially expand in response to element 100 engaging the pilot element. In some aspects, the circumferential surface of the pilot element has an inside diameter less than outer diameter 120 and deformation segments 102 are arranged to circumferentially contract in response to element 100 engaging the pilot element.

FIG. 5 is a cross-sectional view along line 5-5 in FIG. 3. The following should be viewed in light of FIGS. 2 through 5. Line 5-5 is substantially parallel to a radius for element 100 passing through point 126. However, it should be understood that line 5-5 can be any line passing through a radial element, such as segments 108 or 110, and contacting a portion of edges 104 and 106. In some aspects, cross section 128 includes center line 130 between the inner and outer circumferential edges and cross section 128 is substantially symmetrical about the center line. That is, for example, cross section 128 is not asymmetrically tapered, curved, or bowed with respect to the center line. It should be understood that cross section 128 is not limited to the shape or configuration shown in the figures and that other shapes and configurations are included in the spirit and scope of the claimed invention. As described infra, this symmetrical configuration advantageously increases the resistance of element 100 to undesired movement in direction 124. In some aspects, thickness 132 of the radial elements is uniform between edges 104 and 106.

Element 100 also can be considered in light of form angle 134 between surfaces 136 and/or 138 and a radial axis of element 100, for example, angle 134 is measured with respect to a line orthogonal to the circumferential surface of the pilot element. Angle 134 can be seen in the axial misalignment of edges 104 and 106. The magnitude of angle 134 is important with respect to the ability of element 100 to resist movement in direction 124 when element 100 is installed on a pilot element. In general, as angle 134 increases past a certain value, the ability of element 100 to resist movement in direction 124 decreases. Therefore, element 100 is designed and arranged to maintain an optimal angle 134. In some aspects, angle 134 is approximately 22°. As described infra, the action of deformation segments 102 enables element 100 to maintain a consistent angle 134 during changes to diameters 116 and 120.

The action of segments 102 and element 100 under changes in diameters 116 or 120 also can be understood in light of line 112. For example, a modification of circumferences 104 or 106 causes a substantially proportional modification along line 112. That is, element 100 expands and contracts as a whole, maintaining its shape, and when engaged to a pilot element, maintaining angle 134. Alternately stated, the gripping element is substantially free of twisting about line 112 before and after modifying diameters 116 or 120.

Edge 104 includes a plurality of inner circumferential segments 140 and edge 106 includes a plurality of outer circumferential segments 142. Respective inner and outer circumferential segments are joined by respective radially disposed segments, for example, segments 144. In some aspects, each of segments 140 is substantially equal in circumferential length 146 and each of segments 142 is substantially equal in circumferential length 148.

It should be understood that element 100 is not limited to the size, shape, number, configuration, or orientation of segments 102, 108, 110, 140, or 142 shown in the figures and that other sizes, shapes, numbers, configurations, and orientations are within the scope and spirit of the claimed invention. For example, in some aspects (not shown), element 100 is not formed solely of segments 102, that is, portions of element 100 are not circumferentially deformable. For example, element 100 can be formed with circumferentially deformable segments connected by intervening non-circumferentially deformable portions.

FIG. 6 is a back exploded view of present invention axial one-way clutch assembly 200 arranged to engage an inner circumference of a pilot element.

FIG. 7 is a front exploded view of axial one-way clutch assembly 200 shown in FIG. 6. The following should be viewed in light of FIGS. 2 through 7. Assembly 200, also referred to as an assembly for incrementally changing an axially fixable position, includes annular gripping element 100, glide push ring 202, and wedge push ring 204. Ring 202 is axially displaceable along a pilot element (not shown) and engageable with gripping element 100. Although gripping element 100 is shown in assembly 200, it should be understood that assembly 200 is not limited to element 100 and that any present invention gripping element can be used in assembly 200.

Ring 202 is arranged to incrementally urge the gripping element in direction 122 along the pilot element. By incrementally urge, we mean that in response to pressure from ring 202 in direction 122, element 100 is axially moveable in small, controllable, incremental steps or axial distances. Wedge push ring 204 is axially displaceable along the pilot element and engageable with the gripping element. The gripping element is arranged to resist motion of wedge push ring in direction 124, opposite direction 122, along the pilot element. Specifically, in response to a relatively smaller force in direction 122, the gripping element is controllably displaceable whereas the gripping element remains axially fixed in response to a relatively larger force in direction 124.

Figure 8:
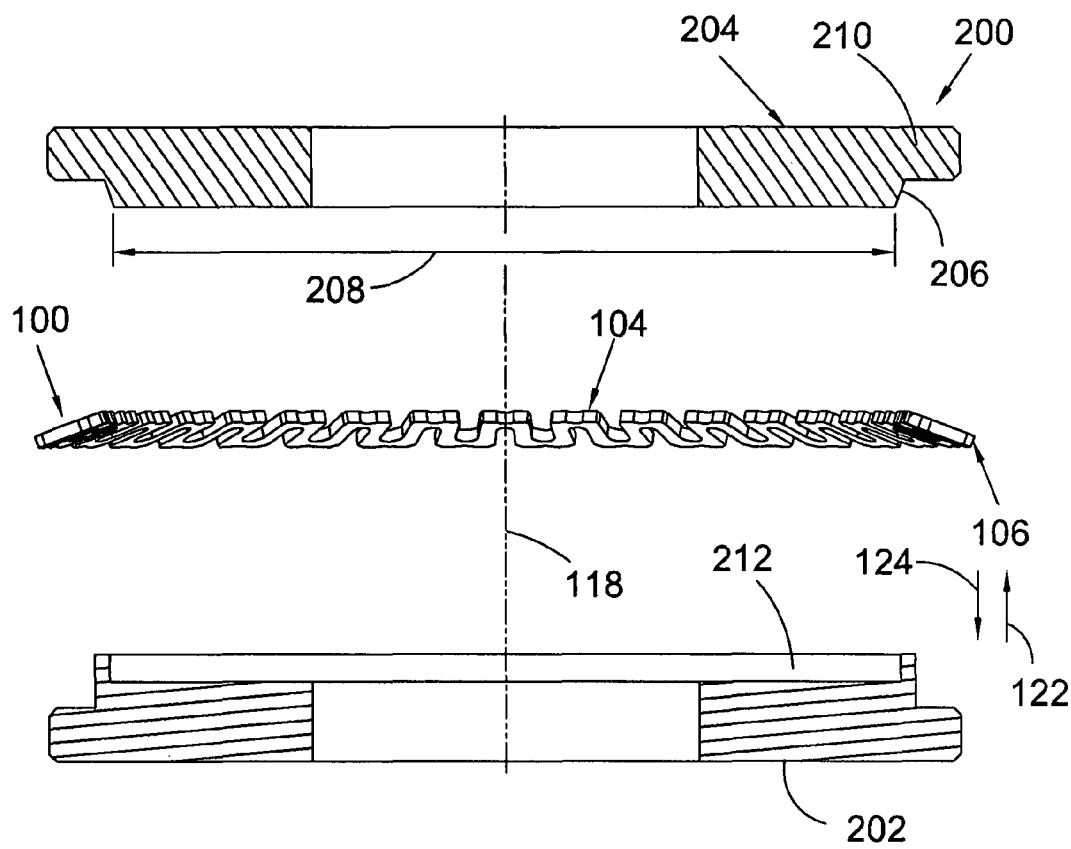
FIG. 8 is an exploded cross-sectional view of the axial one-way clutch assembly shown in FIG. 6 along line 8/9-8/9 in FIG. 6.

FIG. 8 is an exploded cross-sectional view of axial one-way clutch assembly 200 shown in FIG. 6 along line 8/9-8/9 in FIG. 6.

Figure 9:
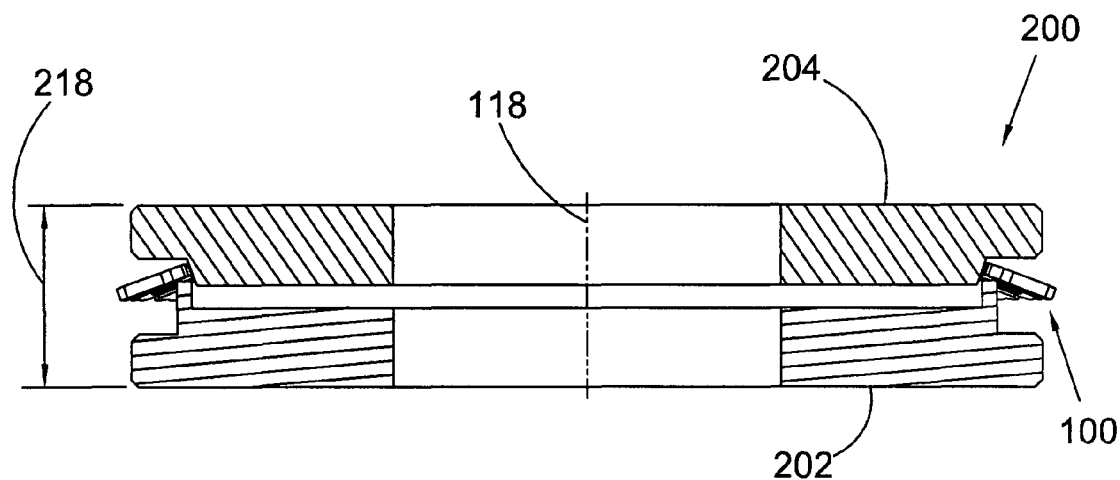
FIG. 9 is a cross-sectional view of the axial one-way clutch assembly shown in FIG. 6 along line 8/9-8/9 in FIG. 6.

FIG. 9 is a cross-sectional view of axial one-way clutch assembly 200 shown in FIG. 6 along line 8/9-8/9 in FIG. 6. The following should be viewed in light of FIGS. 2 through 9. In some aspects, inner edge, surface, or circumference 104 of element 100 and surface 206 of wedge ring 204 are arranged to contact each other when ring 204 is pushed against the gripping element. In some aspects, edge 104 and surface 206 are complimentarily shaped. For example, as shown in FIG. 9, edge 104 and surface 206 fit together with a minimal gap between the edge and surface. Specifically, in some aspects, edge 104 and surface 206 are substantially parallel. In some aspects, surface 206 tapers radially inward in direction 124.

A taper orientation of surface 206 enable ring 204 to "take up" any dimensional disparity between diameter 208 and diameter 116 allowing greater flexibility and use of assembly 200. For example, gripping elements, push rings, and pilot elements having advantageously broader tolerances can be used together and the system can adapt to dimensional changes that may occur during use of the system. For example, if diameter 116 becomes larger due to wear or a change in the pilot element, surface 206 moves further in direction 124 before engaging edge 104. That is, edge 104 contacts surface 206 closer to body 210 of ring 204. Also, when force is applied to ring 204 in direction 124, the ring engages element 100 with a minimal amount of slippage between edge 104 and surface 206.

In general, the contact of edge 104 and surface 206 works to increase the resistance of element 100 to motion in direction 124. For example, wedge ring 204 is arranged to transmit a force to the gripping element in direction 124, specifically, surface 206 transmits the force to edge 104. Gripping element 100 provides a straight loading path for the force between circumferences 116 and 120. For example, due to symmetrical cross-section 128, shown in FIG. 5, the force is transmitted from edge 104 to edge 106 with a minimal distortion or bending of element 100, which increases the force actually applied to the circumferential surface of the pilot element by edge 106. That is, the force is not dissipated by the flexing or distortion of element 100. Increasing the force at edge 106 increases the ability of element 100 to resist movement in direction 124. For example, by remaining rigid, or symmetrical, during the transmitting of force, element 100 maintains the desired angle 134. Alternately stated, cross-section 128 can be referenced with respect to an axial plane.

The surface of the gripping element, for example, surface 150 on edge 106, is arranged and configured to "grip" the circumferential surface of the pilot element in response to pressure from the wedge ring. Surface 150 can be formed in any way known in the art to optimize a gripping interface between element 100 and the pilot element surface. For example, surface 150 can include one or more teeth or protrusions 151.

In general, cross section 128 remains symmetrical about center line 130 under a force applied by ring 204 at least up to the rated capacity of element 100. The rated capacity is the maximum force from the wedge ring under which element 100 remains axially fixed. In general, ring 204 contacts element 100 at the circumference opposite the circumference in contact with the pilot element.

In some aspects, ring 202 contacts the gripping element at the circumference opposite the circumference in contact with the pilot element. In some aspects, ring 202 includes annular protrusion 212, which contacts the gripping element. Protrusion 212 pushes on element 100 in direction 122, causing an increase in angle 134 and subsequent loosening of element 100 on the circumferential surface. This loosening allows controlled, incremental movement of element 100 under force applied in direction 122 by ring 202.

Figure 10:
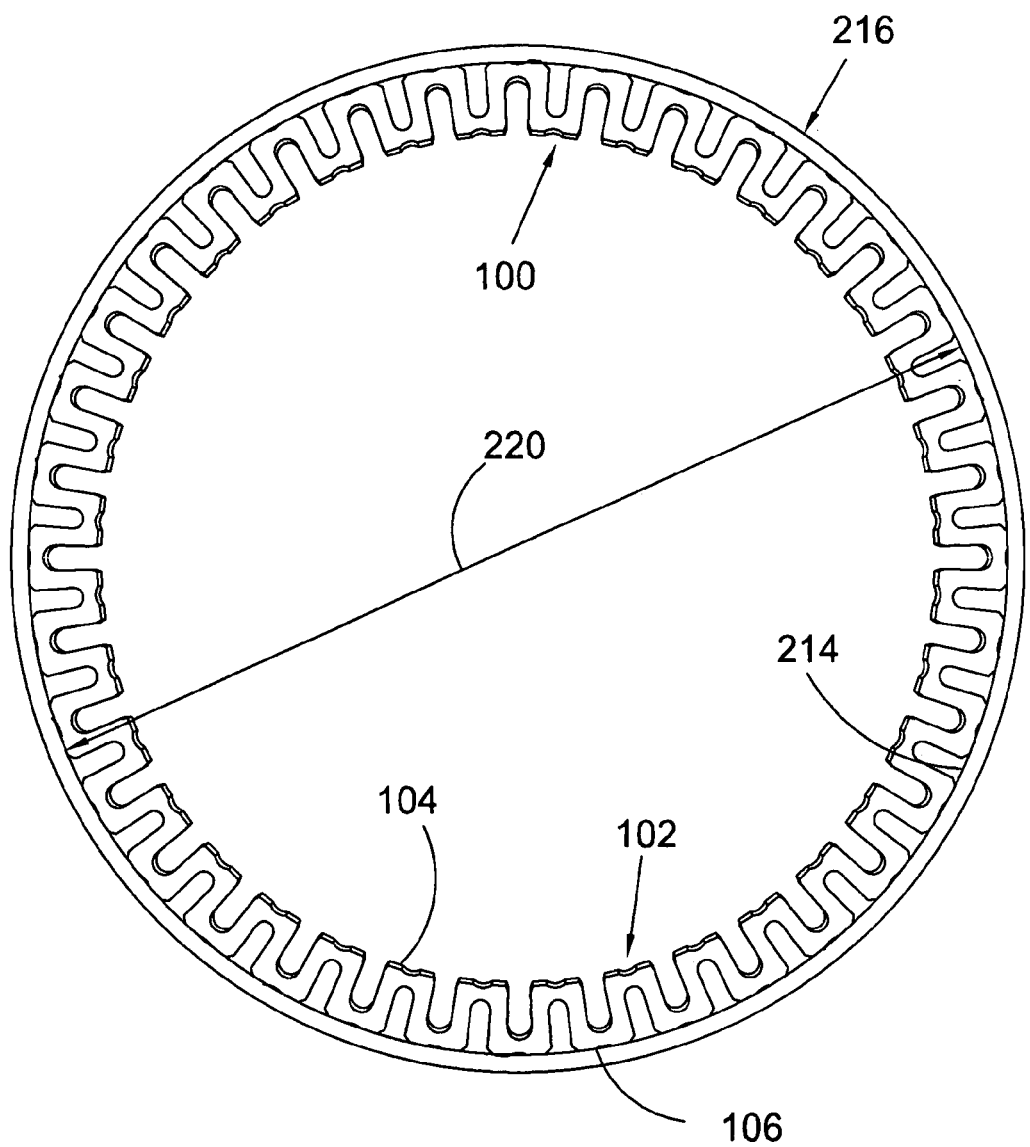
FIG. 10 is a back view of the gripping element of FIG. 10 engaged with an inner circumference of a pilot element.

FIG. 10 is a back view of element 100 engaged with inner circumference 214 of pilot element 216. The configuration of FIG. 10 is applicable to assembly 200.

Figure 11:
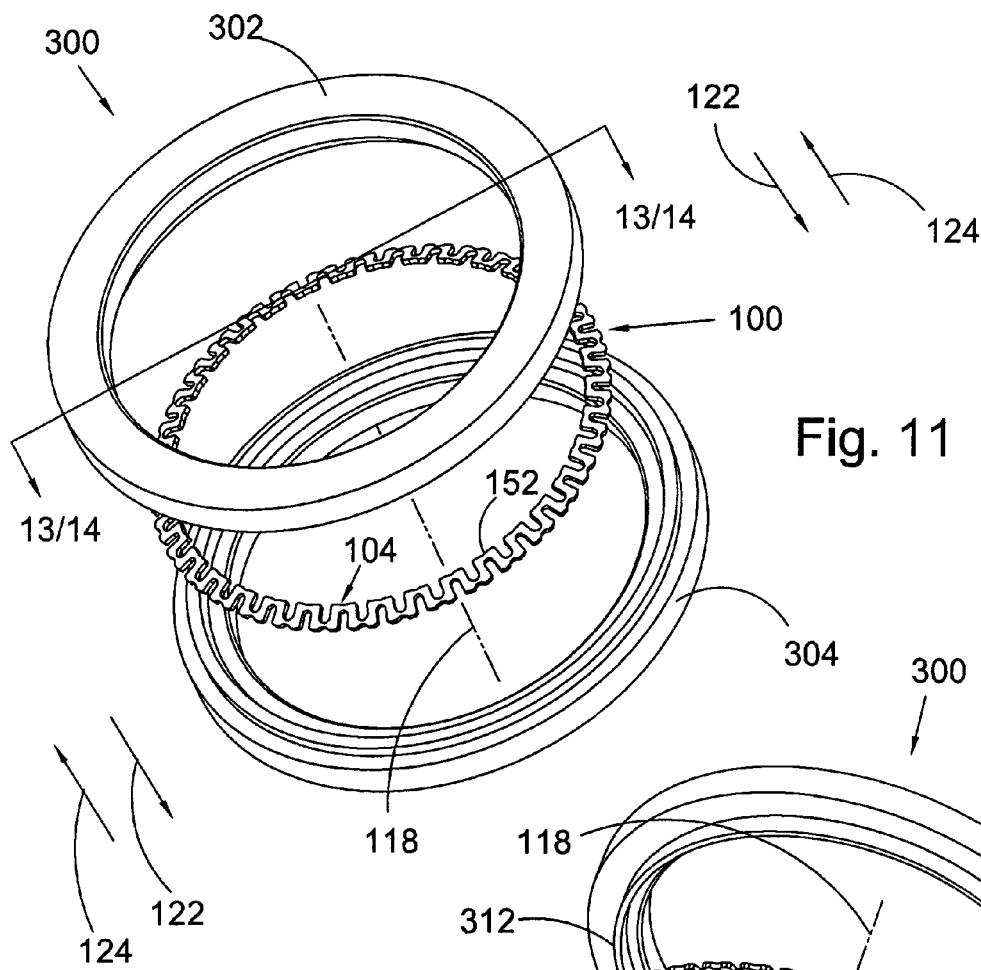
FIG. 11 is a back exploded view of a present invention axial one-way clutch assembly arranged to engage an outer circumference of a pilot element.
Figure 12:
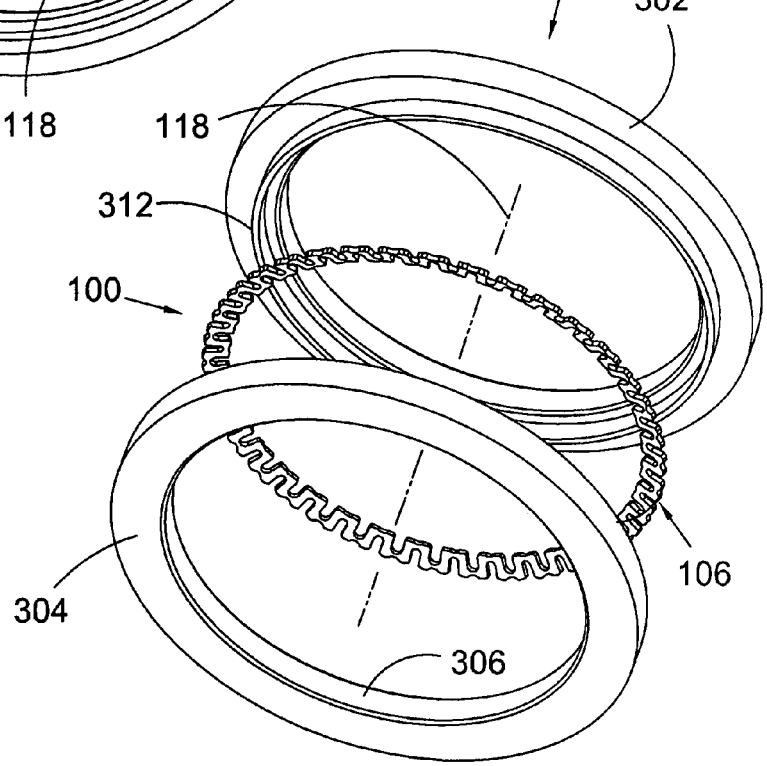
FIG. 12 is a front exploded view of the axial one-way clutch assembly shown in FIG. 11.

FIG. 11 is a back exploded view of present invention axial one-way clutch assembly 300 arranged to engage an outer circumference of a pilot element;

FIG. 12 is a front exploded view of axial one-way clutch assembly 300 shown in FIG. 11. The following should be viewed in light of FIGS. 2 through 5 and 11 and 12. Assembly 300, also referred to as an assembly for incrementally changing an axially fixable position, includes annular gripping element 100, glide push ring 302, and wedge push ring 304. Ring 302 is axially displaceable along a pilot element (not shown) and engageable with gripping element 100. Although gripping element 100 is shown in assembly 300, it should be understood that assembly 300 is not limited to element 100 and that any present invention gripping element can be used in assembly 300.

Ring 302 is arranged to incrementally urge the gripping element in direction 122 along the pilot element. By incrementally urge, we mean that in response to pressure from ring 302 in direction 122, element 100 is axially moveable in small, controllable, incremental steps or axial distances. Wedge push ring 304 is axially displaceable along the pilot element and engageable with the gripping element. The gripping element is arranged to resist motion of wedge push ring in direction 124, opposite direction 122, along the pilot element.

Figure 13:
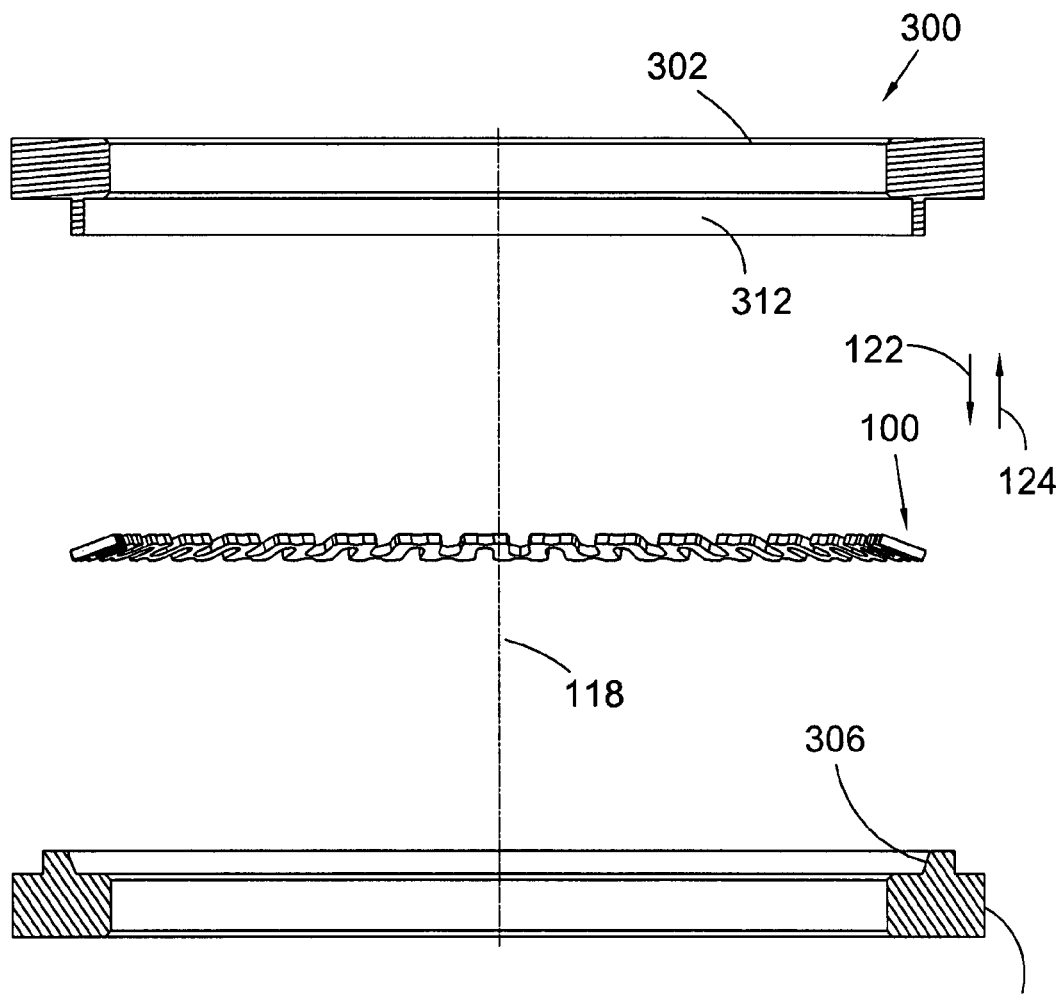
FIG. 13 is an exploded cross-sectional view of the axial one-way clutch assembly shown in FIG. 11 along line 13/14-13/14 in FIG. 11.

FIG. 13 is an exploded cross-sectional view of axial one-way clutch assembly 300 shown in FIG. 11 along line 13/14-13/14 in FIG. 11.

Figure 14:
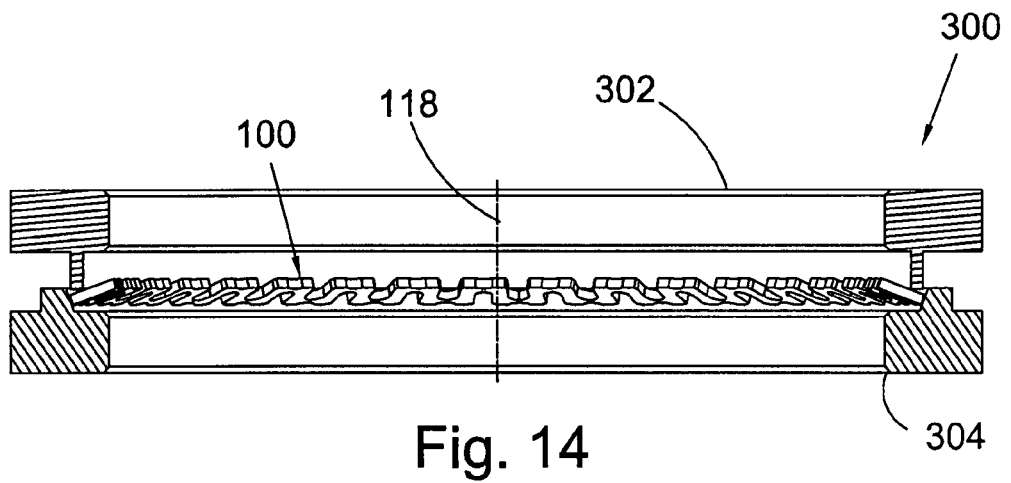
FIG. 14 is a cross-sectional view of the axial one-way clutch assembly shown in FIG. 11 along line 13/14-13/14 in FIG. 11.

FIG. 14 is a cross-sectional view of axial one-way clutch assembly 300 shown in FIG. 11 along line 13/14-13/14 in FIG. 11. The following should be viewed in light of FIGS. 2 through 5 and 11 through 14. In some aspects, outer edge, surface, or circumference 106 of element 100 and surface 306 of wedge ring 304 are arranged to contact each other when ring 304 is pushed against the gripping element. In general, the discussion in the descriptions of FIGS. 6 through 9 regarding edge 104 and surface 206 is applicable to edge 106 and surface 306. In some aspects, edge 106 and surface 306 are complimentarily shaped. For example, as shown in FIG. 14, edge 106 and surface 306 fit together with a minimal gap between the edge and surface. Specifically, in some aspects, edge 106 and surface 306 are substantially parallel. In some aspects, surface 306 tapers radially outward in direction 124. The discussion in the descriptions of FIGS. 8 and 9 regarding the taper of surface 206 is applicable to surface 306, and for the sake of brevity, is not repeated.

In general, the contact of edge 106 and surface 306 works to increase the resistance of element 100 to motion in direction 124. For example, wedge ring 304 is arranged to transmit a force to the gripping element in direction 124, specifically surface 306 transmits the force to edge 106. Gripping element 100 provides a straight loading path for the force between circumferences 116 and 120, as discussed in the descriptions of FIGS. 8 and 9. For example, surface 152 on edge 104, is arranged and configured to "grip" the circumferential surface of the pilot element in response to pressure from the wedge ring.

In general, cross section 128 remains symmetrical about center line 130 under a force applied by ring 304 at least up to the rated capacity of element 100. In general, ring 304 contacts element 100 at the circumference opposite the circumference in contact with the pilot element.

In some aspects, ring 302 contacts the gripping element at the circumference opposite the circumference in contact with the pilot element. In some aspects, ring 302 includes annular protrusion 312, which contacts the gripping element. Protrusion 312 pushes on element 100 in direction 122, causing an increase in angle 134 and subsequent loosening of element 100 on the circumferential surface. This loosening allows controlled, incremental movement of element 100 under force applied in direction 122 by ring 302.

Figure 15:
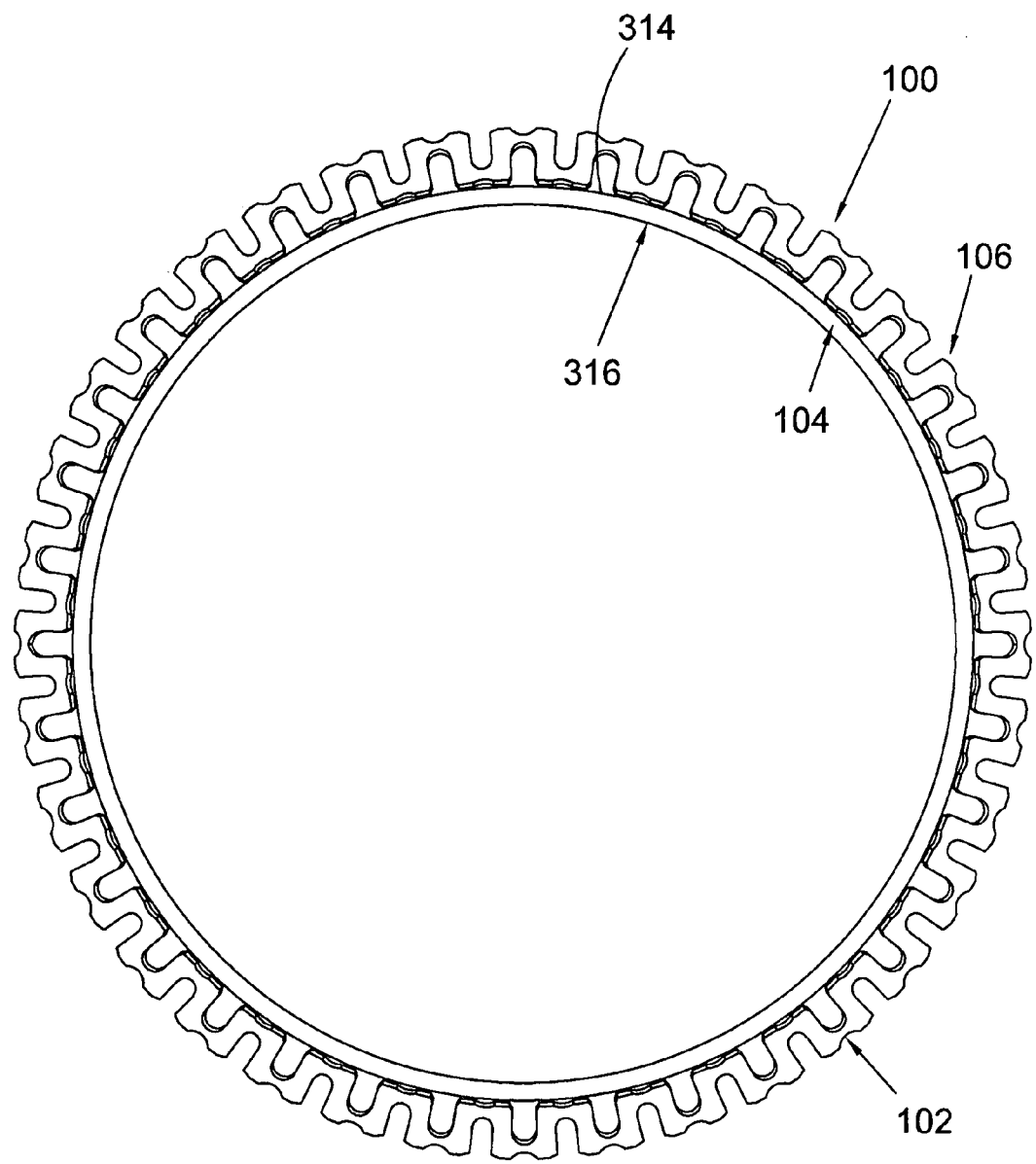
FIG. 15 is a back view of the gripping element of FIG. 11 engaged with an outer circumference of a pilot element.

FIG. 15 is a back view of gripping element 100 of FIG. 11 engaged with outer circumference 314 of a pilot element 316. This configuration is applicable to assembly 300.

Figure 16:
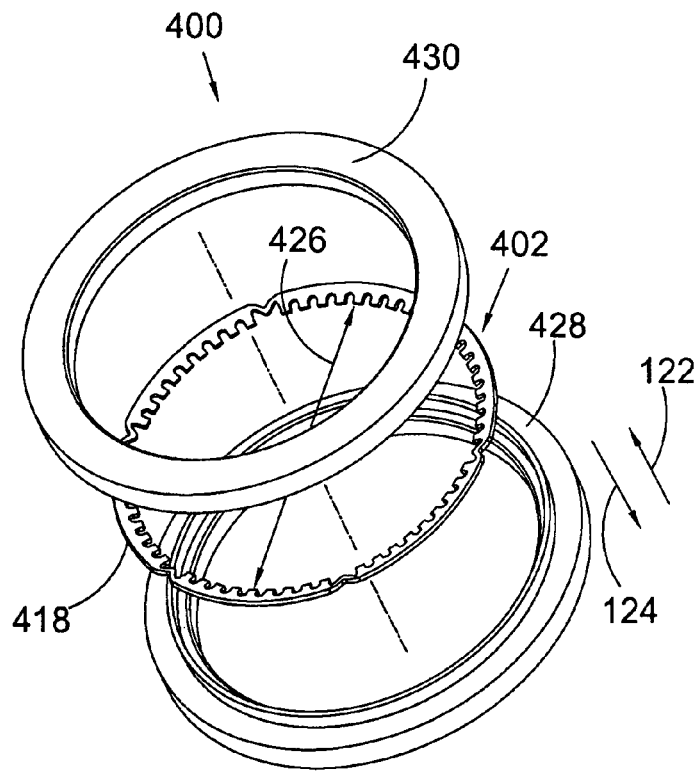
FIG. 16 is a front exploded view of a present invention axial one-way clutch assembly arranged to engage an outer circumference of a pilot element.

FIG. 16 is a front exploded view of present invention axial one-way clutch assembly 400 arranged to engage an outer circumference of a pilot element.

Figure 17:
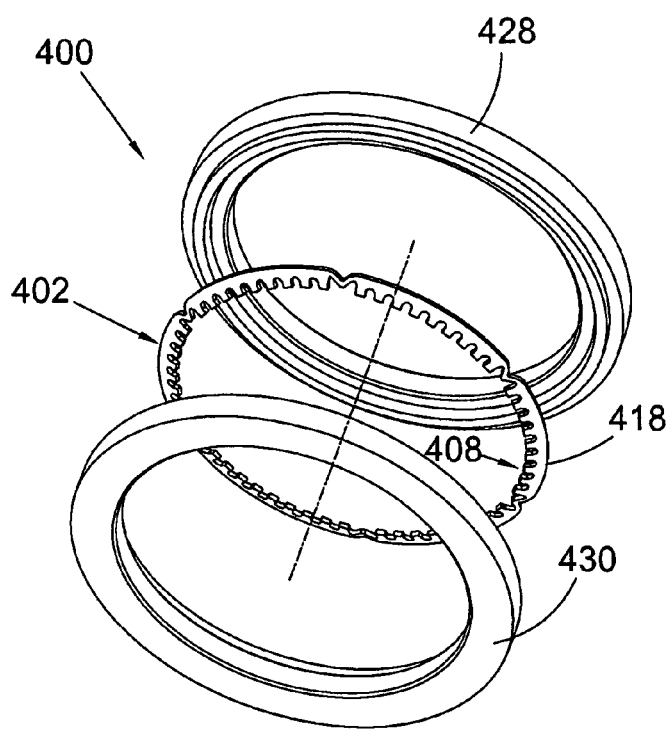
FIG. 17 is a back exploded view of the axial one-way clutch assembly shown in FIG. 16.

FIG. 17 is a back exploded view of axial one-way clutch assembly 400 shown in FIG. 16.

Figure 18:
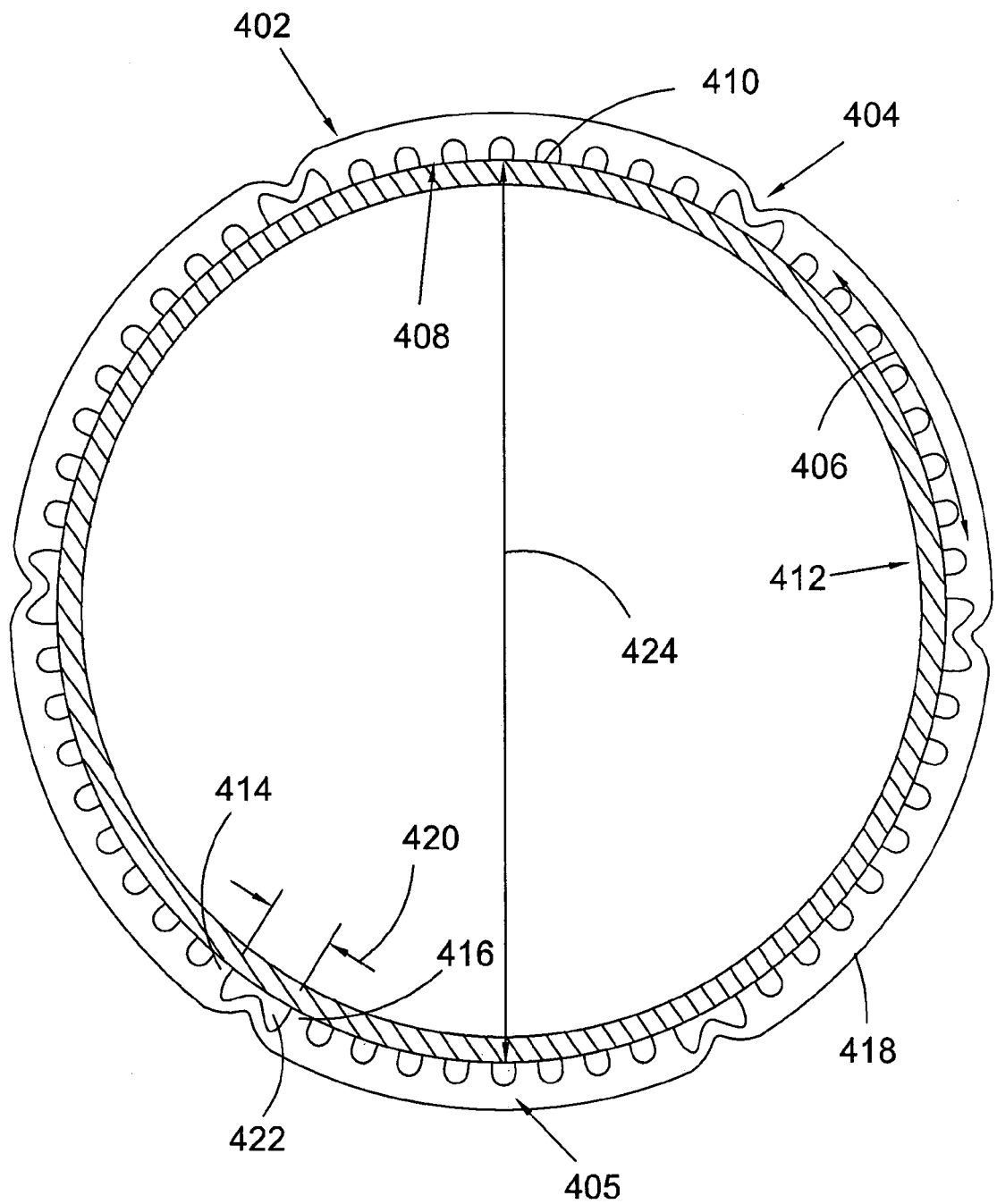
FIG. 18 is a front view of the gripping element of FIG. 16 engaged with an outer circumference of a pilot element.

FIG. 18 is a front view of gripping element 402 of FIG. 16 engaged with an outer circumference of a pilot element. The following should be viewed in light of FIGS. 16 through 18. Gripping element 402 has a different configuration of deformation segments, specifically, segments 404, than element 100 shown supra. Element 100, shown in FIG. 8, was entirely formed of deformation segments 102. In contrast, element 400 includes one or more deformation segments 404 and less-deformable segments 405 circumferentially spaced about the element. In some aspects, segments 404 are equally spaced about the circumference of element 400, for example, with respect to circumferential line 406. Line 406 extends all around element 400, however, for the sake of clarity is only shown in part.

Inner circumference, edge, or surface 408 of element 402 is arranged to engage circumferential surface 410 of pilot element 412. In response to that engagement, deformation segments 404 are circumferentially deformable. For example, radial segments 414 and 416 move closer together or further apart with respect to circumferential line 406, which is between inner edge 408 and outer edge 418. For example, segments 414 and 416 move apart, increasing width 420 of space 422 if inner edge 408 is sufficiently expanded. In some aspects, circumferential surface 410 of the pilot element has an outer diameter 424 greater than inner diameter 426 of element 400 and deformation segments 404 are arranged to circumferentially expand in response to element 400 engaging the pilot element. As described for element 100 in FIGS. 2 through 15, gripping element 400 is arranged to incrementally move along the pilot element in one axial direction and resist movement along the pilot element in the opposite axial direction.

Assembly 400 includes glide push ring 428 and wedge push ring 430. The discussion in the descriptions of FIGS. 8 through 10 regarding push ring 202 and wedge ring 204 with respect to assembly 200 is generally applicable to push ring 428 and wedge ring 430 in assembly 400.

Figure 19:
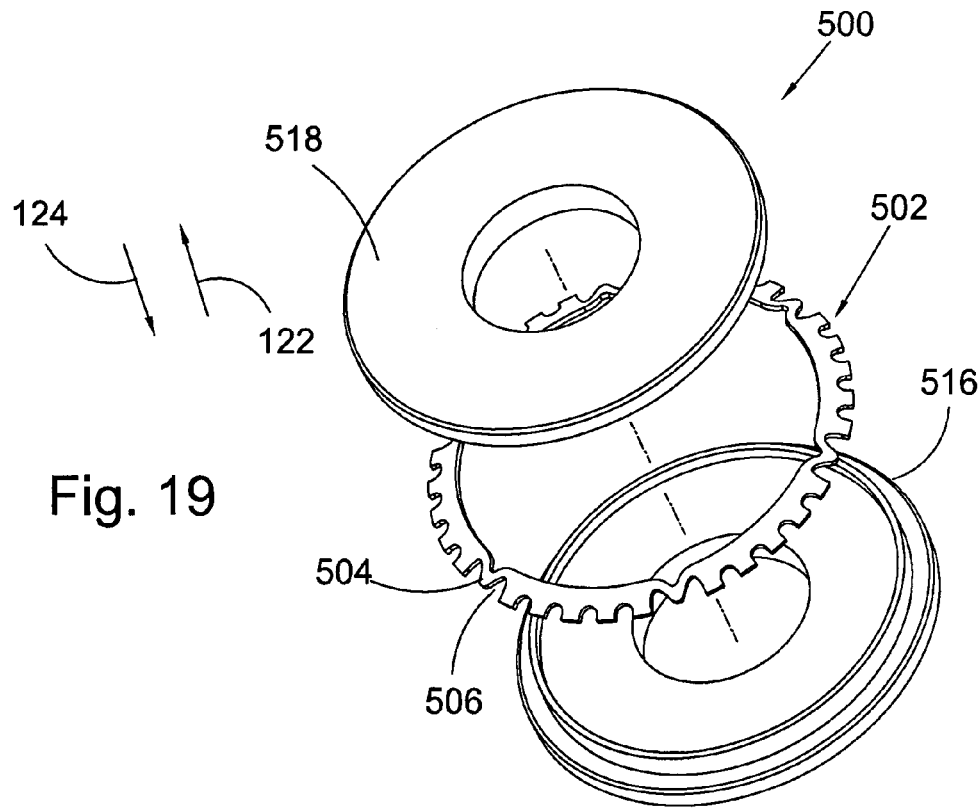
FIG. 19 is a back exploded view of a present invention axial one-way clutch assembly arranged to engage an inner circumference of a pilot element.

FIG. 19 is a back exploded view of present invention axial one-way clutch assembly 500 arranged to engage an inner circumference of a pilot element.

Figure 20:
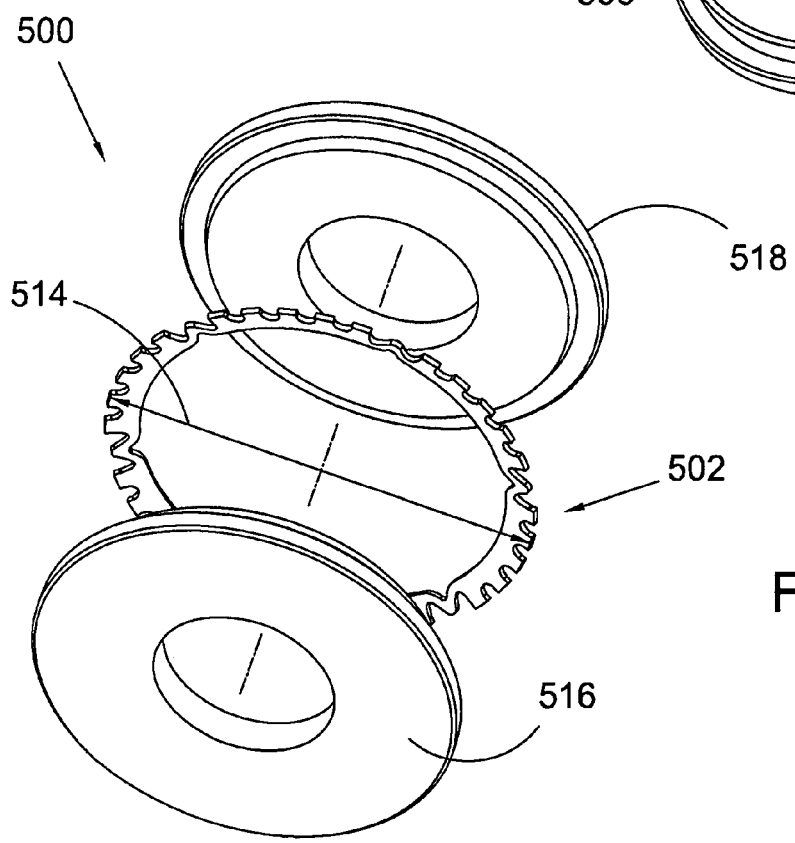
FIG. 20 is a front exploded view of the axial one-way clutch assembly shown in FIG. 19.

FIG. 20 is a front exploded view of axial one-way clutch assembly 500 shown in FIG. 19.

Figure 21:
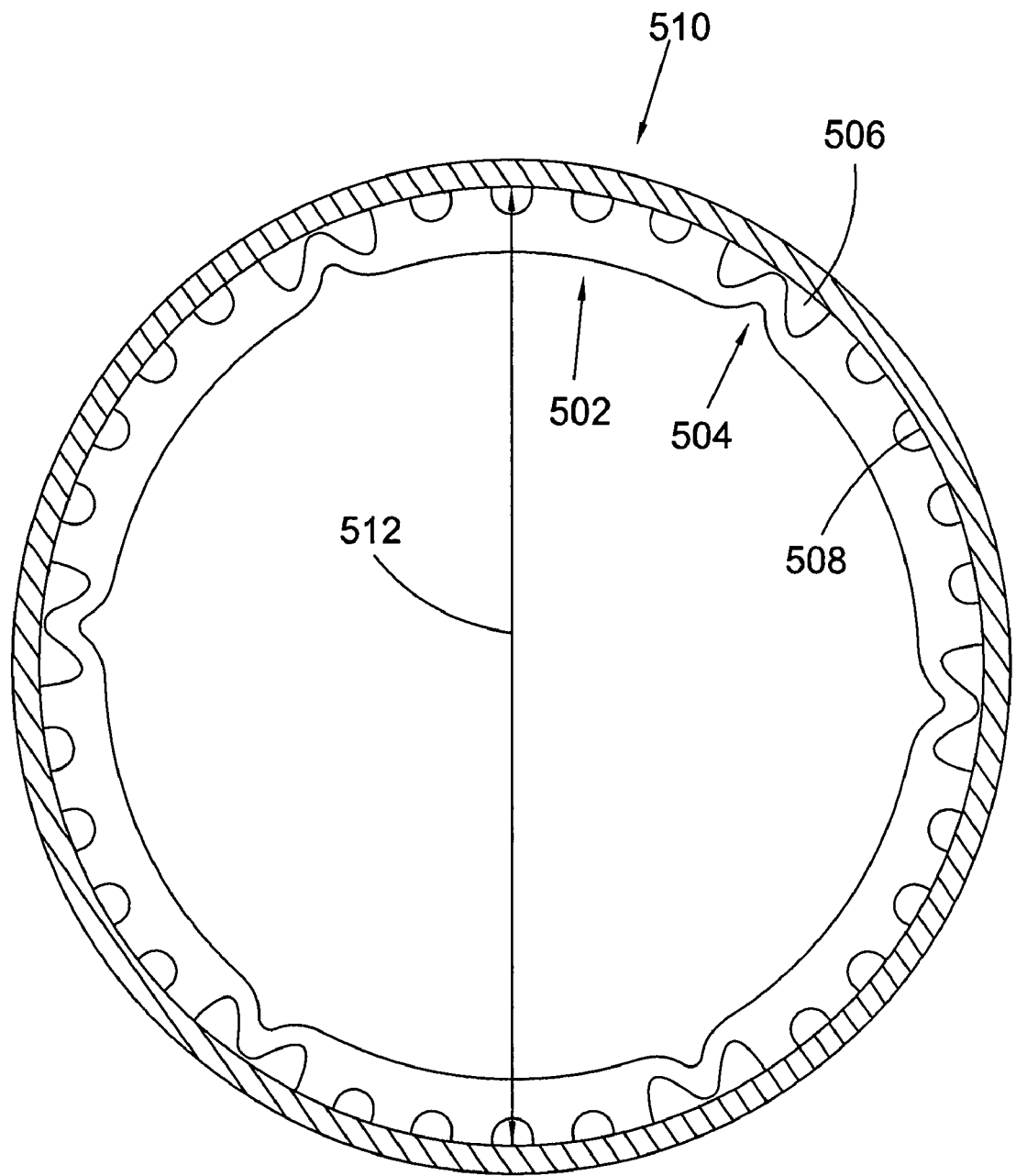
FIG. 21 is a front view of the gripping element of FIG. 19 engaged with an inner circumference of a pilot element; and, FIG. 22 is a partial cross-sectional view of a present invention axial one-way clutch in a release assembly.

FIG. 21 is a front view of present invention gripping element 502 engaged with an inner circumference of a pilot element. The following should be viewed in light of FIGS. 19 through 21. Assembly 500 shows an alternative configuration of a present invention gripping element. Specifically, the configuration of element 402 shown in FIGS. 16 through 18 is radially reversed to form element 502. For example, deformable segments 504 have openings 506 facing radially outward and element 502 is arranged to engage an inner circumference or circumferential surface of a pilot element, for example, surface 508 of pilot element 510. In some aspects, inner circumference 512 of element 510 has a diameter less outer diameter 514 of element 502 and deformation segments 504 are arranged to circumferentially contract in response to element 502 engaging the pilot element.

Assembly 500 includes glide push ring 516 and wedge push ring 518. The discussion in the descriptions of FIGS. 8 through 10 regarding push ring 202 and wedge ring 204 with respect to assembly 200 is generally applicable to push ring 516 and wedge ring 518 in assembly 500.

The following should be viewed in light of FIGS. 16 through 21. The discussion in the descriptions of FIGS. 2 through 5 regarding cross section 128 is applicable to cross-sections (not shown) of elements 402 and 502. Also the discussion in the descriptions of FIGS. 2 through 5 regarding form angle 134 is applicable to elements 402 and 502 and a pilot element, such as pilot elements 412 or 510, respectively. Further, the discussion in the descriptions of FIGS. 2 through 5 regarding the action of segments 102 and element 100 under changes in diameters 116 or 120 and line 112 is applicable to segments 404 and 504 and elements 402 and 502, respectively. For example, focusing on FIGS. 16 through 18, a modification of the inner or outer circumference of element 402 results in a substantially proportional modification of circumferential line 406. That is, element 402 expands and contracts as a whole, maintaining its shape, and when engaged to a pilot element, maintaining the form angle. Alternately stated, the gripping element is substantially free of twisting about line 406 before and after force is applied to the gripping element by wedge ring 430.

It should be understood that elements 402 and 502 are not limited to the size, shape, number, configuration, or orientation of deformable and non-deformable segments shown in the figures and that other sizes, shapes, numbers, configurations, and orientations are within the scope and spirit of the claimed invention. For example, in some aspects (not shown), element 400 includes different numbers' of segments 404 and 405. It also should be understood that, in general, the discussion in the descriptions of FIGS. 8 through 14 is applicable to assemblies 400 and 500.

The following should be viewed in light of FIGS. 2 through 21. The following discussion is with respect to assembly 200, however, it should be understood that the discussion is applicable to all present invention gripping elements and assemblies for incrementally changing an axially fixable position. The circumferential flexibility of element 100 results in increased tolerance absorption for assembly 200. For example, in some aspects, element 100 is usable with pilot element circumferential surface 214 having a diametric tolerance stack-up of at least 0.3 mm. The ability to absorb such tolerances is, advantageous as this enables the industrialization of the pilot element, that is, the broadening of specifications so that the pilot element can be more easily and quickly produced for, less cost. At the same time, assembly 200 is relatively narrow, axially. In some aspects, assembly 200 has an axial length 218 of less than 5 mm.

Element 100 is designed to move in axial direction 122 in response to a minimum force applied by push ring 202, that is, element 100 remains axially fixed in response to a force less than the minimum force. Advantageously, this minimum force is relatively low. For example, in some aspects, this force is less than 250 N. The minimum force remains low even at the high end of tolerance stack-up, for example, over 0.3° mm, for example, when the magnitude of inner diameter 220 of pilot element 216 is at the low end of the tolerance range for the diameter. That is, when element 100 is under maximum inward radial compression from element 216. Element 100 is capable of minute, incremental steps in direction 122, for example, in some aspects, steps of 0.01 mm.

Assembly 200 reaches lock-up quickly in response to force applied by ring 204 on element 100 in direction 124. In some instances, element 100 presents a resistance of over 500 N in direction 122 after less than 0.1 mm travel in direction 124. Assembly 200 maintains lock-up even at the edge of system tolerances. For example, element 100 maintains locked with respect to a force of over 1,000 N despite a loose tolerance stack-up of only 0.1 mm, for example, when the magnitude of inner diameter 220 of pilot element 216 is at the high end of the tolerance range for the diameter. That is, when element 100 is under minimum inward radial compression from element 216. Further, element 100 is designed to remain axially fixed (does not move in direction 124) up to a maximum force applied by wedge ring 204. In some aspects, the maximum force is more than 1,000 N. Thus, in some aspects, the maximum force in direction 124 is at least four times the minimum force in direction 122.

Thus, assembly 200 provides high lock-up loads, low glide loads, short travel to lock-up, absorption of tolerance stack-up between element 100 and pilot element 216, is capable of any amount of free travel, and is axially compact. In some aspects, rings 202 and 204 are rotatable with respect to pilot element 216.

Figure 22:
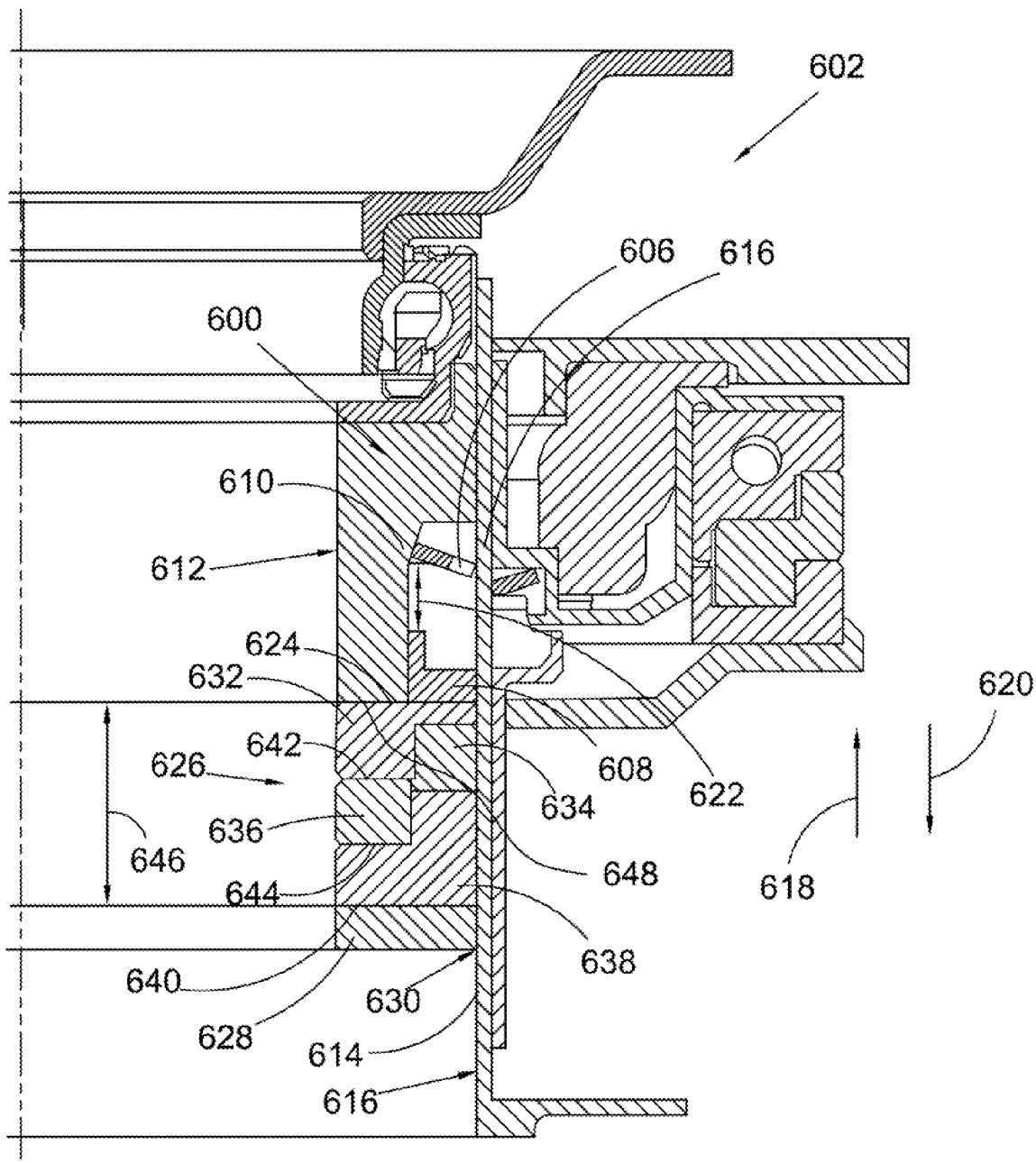

FIG. 22 is a partial cross-sectional view of a present invention axial one-way clutch 600 in release assembly 602. It should be understood that any present invention gripping element can be used in clutch 600. The discussions in the descriptions for FIGS. 2 through 10 and 19 through 21 are applicable to clutch 600. In some aspects, present invention glide and push rings are axially fixed with respect to each other. That is, the rings move in axial unison along the pilot element. In some aspects, a present invention assembly is used as a travel limiter. For example, release assembly 602 is used to automatically compensate for disc facing wear in a clutch (not shown and hereafter referred to as the torque clutch). That is, assembly 602 maintains a substantially constant travel or clutch stroke despite changes in the thickness of a disc plate associated with assembly 602. Clutch 600 includes gripping element 606, glide ring 608, and wedge ring 610, which is integral to sleeve 612. Ring 608 is axially secured to sleeve 612, that is, ring 608 is secured such that the ring and sleeve 612 are axially locked. Thus, rings 608 and 610 also are axially fixed with respect to each other. The outer circumference of element 606 is engaged with inner circumference 614 of tube 616.

As the clutch is applied, sleeve 612 and ring 608 move in direction 618 (glide direction). As the clutch is released, sleeve 612 and ring 608 move in direction 620 (lock-up direction). Thus, travel 622 is the distance sleeve 612 moves in direction 618 before the torque clutch engages. For purposes of illustration, we assume that the initial travel associated with assembly 602 is equal to distance 622. The placement of element 606 determines distance 622. Distance 622 can be established by initially locating element 606 at distance 622 from ring 608, or by locating element 606 closer to ring 608 and having ring 608 engage the element and move the element in direction 618, for example, the first time the torque clutch is applied. The point at which the torque clutch engages' and sleeve 612 is blocked from further movement in direction 618 then establishes distance 622. After a clutch stroke (movement of sleeve 612 in direction 618), sleeve 612 moves back in direction 620 until ring 610 wedges against element 606. As described supra for present invention gripping elements, element 606 remains fixed against relatively large forces in direction 620. Therefore, initially, sleeve 612 comes to rest at the position for element 606 determined by distance 622. That is, the position of element 606 determines the point from which sleeve 612 begins movement in direction 620 during a torque clutch stroke.

As the torque clutch disc wears, sleeve 612 moves further in direction 618 with the torque clutch stroke. Without element 606, sleeve 612 returns to rest at surface 624, the top of ramp assembly 626, after each stroke. Then, as the disc wore, sleeve 612 would need to move further in direction 618 to engage the torque clutch. That is, the resting point for sleeve 612 would remain fixed despite the longer distance that sleeve 612 would need to travel. However, assembly 602 maintains a consistent travel (distance that sleeve 612 travels) by controlling the axial disposition of ring 610. For example, if the torque clutch wears by 0.5 mm, sleeve 612, and ring 610, travel 0.5 mm further in direction 618. However, ring 608, axially fixed to ring 610, also moves 0.5 mm further in direction 618. As a result, glide ring 608 moves element 606 0.5 mm further in direction 618, establishing a new resting point for ring 610. Thus, a constant measure for the travel or clutch stroke is maintained. That is, instead of dropping back the extra 0.5 mm associated with the disc wear, sleeve 612 drops and is held by element 606, which has been moved 0.5 mm further in direction 618.

Release assembly 602 also includes plate 628, axially fixed to an actuator (not shown) and ramp assembly 626. The actuator moves plate 628 and hence, ramp assembly 626 and sleeve 612, in direction 618 to complete a clutch stroke. Plate 628 is zeroed with respect to point 630, that is, plate 628 axially returns to point 630 after each stroke, regardless of the travel distance. Therefore, as the clutch disc wears by a certain amount and 612 is repositioned by that certain amount in direction 618 by the action of ring 608 and element 606, a gap equal to the certain amount would appear between sleeve 612 and surface 624. Then, in subsequent strokes, the actuator would be required travel the length of the gap before surface 624 engaged sleeve 612. However, ramp segments 632, 634, 636, and 638 of assembly 626 operate to fill the gap.

Specifically, surfaces 624 and 640 are flat radial surfaces and the radial surfaces common between two ramp elements, for example, surfaces 642 and 644 of segment 636, are axially sloped. In an example of the operation of assembly 626, as segment 632 is rotated in a first direction with respect to rotationally fixed segment 638, the remaining segments rotate so that length 646 increases. As segment 632 is rotated in the opposite direction with respect to segment 638, the remaining segments rotate so that length 646 decreases. Assembly 626 is pre-loaded to rotate in the direction causing an increase in length 646. However, the slope of the ramps is slight enough that a relatively small axial force is able to keep the assembly from expanding, for example, the force exerted by the actuator and sleeve 612 on surfaces 640 and 624, respectively. Thus, as the gap noted above forms and the axial pressure in direction 620 on surface 624 diminishes, the ramp segments begin to unwind until surface 624 comes into contact with surface 648 of sleeve 612, now in the new position associated with the repositioning of element 606 noted above.

In some aspects (not shown), a present invention one-way axial clutch is engaged with the outer circumference of a pilot element in a release assembly. In some aspects (not shown), a present invention assembly for incrementally changing an axially fixable position is used in a dual clutch assembly, with an all-wheel drive system, or with a limited slip differential.

In a manner similar to that described for FIG. 22, a present invention one-way axial clutch can be used to compensate for tolerances in an axially stacked assembly, for example, a clutch. For example, rather than using shims or other adjustment means to establish a specified travel or stroke length for the stacked assembly, an assembly similar to clutch 600 can be used. As the stacked assembly is initially activated and the various components are axially displaced by the operation of the assembly, the components interact and settle into a configuration that accounts for and is established by the various tolerances and interfaces of the components. Without shims or other measures before hand, the final configuration, and therefore, the stroke length, cannot be predicted. However, as shown in FIG. 22, the combination of glide and wedge push rings and a gripping element in a present invention one-way axial clutch enable the establishment of a consistent travel despite dimensional variations for components outside the clutch. For example, returning to FIG. 22, if loose tolerances result in sleeve 612 traveling a further distance in direction 620, the desired stroke length is established by the action of ring 608 on element 606.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

We claim:

1. An assembly for incrementally changing an axially fixable position, comprising:
   an annular gripping element having an outer edge with at least one radially aligned depression; and at least one deformation segment, said at least one radially aligned depression forming an edge of said at least one deformation segment, said gripping element in contact with a circumference of a pilot element and said at least one deformable segment circumferentially deformable responsive to a change in a diameter of said gripping element;
   a glide push ring axially displaceable along said pilot element and arranged to incrementally urge said gripping element in a first direction along said pilot element; and,
   a wedge push ring axially displaceable along said pilot element and wherein said gripping element is arranged to axially fix its position with respect to the pilot element, in response to a force applied by said wedge push ring in a second direction, opposite said first direction, along said pilot element; and, wherein said glide push ring and said wedge push ring are axially fixed with respect to each other.

2. The assembly recited in claim 1 wherein said annular gripping element further comprises a circumference and said wedge ring further comprises a surface arranged to contact said circumference of said gripping element, wherein said circumference and said surface of said gripping element are complimentarily shaped.

3. The assembly recited in claim 2 wherein said circumference of said gripping element and said surface are substantially parallel.

4. The assembly recited in claim 2 wherein said surface tapers radially in said second direction.

5. The assembly recited in claim 4 wherein said surface tapers radially inward.

6. The assembly recited in claim 4 wherein said surface tapers radially outward.

7. The assembly recited in claim 2 wherein said gripping element further comprises inner and outer circumferences and a straight loading path between said inner and outer circumferences in response to said force.

8. The assembly recited in claim 2 wherein said pilot element comprises an axial plane and said gripping element further comprises a cross section taken along said axial plane and wherein said cross section is substantially symmetrical about said axial plane.

9. The assembly recited in claim 8 wherein said gripping element further comprises inner and outer circumferences with respective surfaces and said cross section comprises said respective surfaces.

10. The assembly recited in claim 9 wherein said cross section is symmetrical about said axial plane under said force.

11. The assembly recited in claim 1 wherein said circumference further comprises a circumferential surface and said gripping element further comprises a surface arranged to engage said circumferential surface.

12. The assembly recited in claim 1 wherein said gripping element further comprises inner and outer circumferences, one of said inner and outer circumferences is arranged to contact said circumference, and said wedge ring is arranged to contact said gripping element proximate the other of said inner and outer circumferences.

13. The assembly recited in claim 1 wherein said gripping element further comprises inner and outer circumferences, one of said inner and outer circumferences is arranged to contact said circumference, and said glide push ring is arranged to contact said gripping element proximate the other of said inner and outer circumferences.

14. The assembly recited in claim 1 wherein said gripping element further comprises inner and outer circumferences and a circumferential line between said inner and outer circumferences and wherein said gripping element is arranged such that a modification of one of said inner and outer circumferences causes a substantially proportional modification of said circumferential line.

15. The assembly recited in claim 1 wherein said gripping element further comprises inner and outer circumferences and a circumferential line between said inner and outer circumferences, and said gripping element is arranged to be free of twisting about said circumferential line after said application of said force.

16. The assembly recited in claim 1 wherein said circumference further comprises an inner circumference of said pilot element.

17. The assembly recited in claim 1 wherein said circumference further comprises an outer circumference of said pilot element.

18. The assembly in claim 1 wherein said glide push ring and said wedge push ring are arranged to be rotatable with respect to said pilot element.

19. The assembly in claim 1 wherein said gripping element is arranged to be displaceable in said first direction in response to a minimum force applied by said glide push ring with at least a first magnitude, said gripping element is arranged to be non-displaceable in said second direction in response to a maximum force applied by said wedge push ring up to a second magnitude, and said second magnitude is at least four times greater than said first magnitude.

20. The assembly recited in claim 1 wherein said gripping element further comprises inner and outer circumferences and a surface disposed between said inner and outer surfaces and wherein said surface is arranged to form an angle with respect to said pilot element and said gripping element is arranged to maintain said angle in response to changes in said inner and outer circumferences.

21. The assembly recited in claim 1 wherein said changes in said inner and outer circumferences are radial.

\* \* \* \* \*